United States Patent Office 3,838,010
Patented Sept. 24, 1974

3,838,010
PHOTOMETRIC METHOD FOR DETERMINING LACTIC ACID DEHYDROGENASE OR GLUCOSE-6-PHOSPHATE DEHYDROGENASE
Frank E. Hammer, Skokie, Ill., assignor to G. D. Searle & Co., Chicago, Ill.
No Drawing. Continuation-in-part of abandoned application Ser. No. 838,664, July 2, 1969. This application Jan. 17, 1972, Ser. No. 218,477
Int. Cl. G01n 31/14
U.S. Cl. 195—103.5 R
9 Claims

ABSTRACT OF THE DISCLOSURE

An improved photometric method for the determination of reduced di- and tri-phosphopyridine nucleotides in an incubation mixture containing lactic acid dehydrogenase or glucose-6-phosphate dehydrogenase and the appropriate substrates therefor, comprising adjusting the pH of the reaction mixture to form about 10.0 to about 12.0, prior to the photometric determination, to stabilize the absorbance of the resulting solution when measured at about 340 m$\mu$.

---

This application is a continuation-in-part of my co-pending application Ser. No. 838,664, filed July 2, 1969, and now abandoned.

This invention relates to an improvement in a direct photometric method for the assay of mixtures including the lactic acid dehydrogenase enzyme in conjunction with the DPN-DPNH, pyruvate-lactate substrate system or the glucose - 6 - phosphate dehydrogenase enzyme in conjunction with the TPN-TPNH, glucose - 6 - phosphate - 6-phosphogluconic acid substrate system. DPN is an abbreviation for diphosphopyridine nucleotide, which is also referred to as nicotinamide adenine dinucleotide, which is also abbreviated as NAD. DPNH and NADH are abbreviated to as nicotinamide adenine dinucleotide, which is also referred to as reduced diphosphopyridine nucleotide. Similarly, TPN is an abbreviation for triphosphopyridine nucleotide, which is also referred to as nicotinamide adenine dinucleotide phosphate, which is also abbreviated NADP. TPNH and NADPH are abbreviations for the reduced form of this substance, which is also referred to as reduced triphosphopyridine nucleotide and reduced nicotinamide adenine dinucleotidephosphate.

Photometry is generally preferred in enzyme assays over manometric and pH procedures, because of its simplicity, rapidity and usually the capability of measuring lower enzyme and substrate concentrations.

Enzymes are biochemical catalysts that enable many complex chemical reactions to take place at ordinary temperatures. An important class of enzymes are the dehydrogenases, which in the presence of a hydrogen acceptor such as pyridine nucleotide, effect dehydrogenation.

Lactic acid dehydrogenase, which is commonly abbreviated LDH and which has the systemic name: L-lactate; NAD oxidoreductase catalyses the reversible oxidation of L-$\alpha$-hydroxy monocarboxylic acids. The enzyme is stereospecific for L-lactate and shows high activity with the pyruvate-lactate couple. Thus, LDH catalyses the reaction:

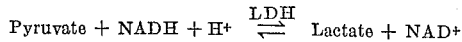

Pyruvate + NADH + H+ $\overset{\text{LDH}}{\rightleftharpoons}$ Lactate + NAD+

Where an unknown quantity of pyruvate is to be determined, appropriate amounts of NADH and LDH are incubated in an appropriately buffered solution to result in the formation of lactate and NAD. When lactate is to be determined, appropriate amounts of NAD and LDH are incubated in an appropriately buffered solution and the reaction allowed to proceed with the formation of pyruvate and NADH. When LDH is the unknown, the sample of material thought to contain LDH is incubated in an appropriately buffered mixture with either pyruvate and NADH or lactate and NAD. The terms "pyruvate" and "lactate" refer, respectively, to the anions

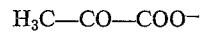

H$_3$C—CO—COO$^-$ and H$_3$C—CHOH—COO$^-$ which are present in the aqueous solution.

Glucose-6-phosphate dehydrogenase, which is commonly abbreviated G6PDH and which has the systemic name: D-glucose - 6 - phosphate: NADP oxido-reductase catalyzes the reversible oxidation of glucose-6-phosphate, the product of this oxidation being 6-phosphogluconic acid. Glucose - 6 - phosphate and 6-phosphogluconic acid are commonly abbreviated to G6P and 6-PGA respectively. Thus G6PDH catalyzes the reaction:

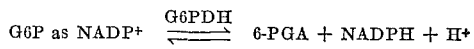

G6P as NADP+ $\overset{\text{G6PDH}}{\rightleftharpoons}$ 6-PGA + NADPH + H+

Where an unknown quantity of glucose-6-phosphate is to be determined, appropriate amounts of NADP and G6PDH are incubated in an appropriately buffered solution to result in the formation of 6-phosphogluconic acid and in NADPH. When 6-phosphogluconic acid is to be determined, appropriate amounts of NADPH and G6PDH are incubated in that appropriately buffered solution and the reaction allowed to proceed with the formation of glucose-6-phosphate and NADP. When G6PDH is the unknown, the sample of material thought to contain 6GPDH activity is incubated in an appropriately buffered mixture with either G6P and NADP or 6-PGA and NADPH. The determination of the presence of LDH or G6PDH activity or of the presence of their respective substrates has been used for various purposes in clinical chemistry.

A wide variety of photometric assays have been used to determine LDH activity. Colorimetric methods have been based on the formation of pyruvate 2,4-dinitrophenylhydrazone or upon the formation of a red formazin in colloidal suspension. A method involving an ultraviolet spectrophotometer has been used in which the lactate is reacted with $\beta$-quinolhydrazine to form a hydrozone having an absorption peak at 305 millimicrons (m$\mu$). A fluorometric method described in U.S. Pat. No. 3,384,555 involves the determination of the DPNH by reaction with resazurin in the presence of diaphorase.

The activity of G6PDH can also be measured by a variety of methods. In the presence of nicotinamide and methylene blue the amount of oxygen consumed in the reoxidation of TPNH to TPN, can be measured manometrically. Alternatively, G6PDH activity can be measured photometrically by following the rate of reduction of 2,6-dichlorophenolindophenol, using phenazine methosulphate [PMS] as an electron carrier.

LDH and G6PDH activity can be measured spectrophotometrically by following the rate of change of the absorbance at about 340 m$\mu$, the absorption peak of DPNH and TPNH. DPN and TPN have no absorbance at this wave length. When using lactate and DPN or G6P and TPN as substrates, the rate of increase of A$_{340}$ is measured. When using pyruvate and DPNH or 6-PGA and TPNH as substrates, the rate of decrease in A$_{340}$ is measured. The amounts of pyruvate, lactate, G6P or 6-PGA in complex mixtures, can also be determined by measuring the changes in the absorbance at 340 m$\mu$.

Although 340 m$\mu$ is the normally used wavelength for the determination, higher and lower wavelengths have been used for the determination and wavelength shifters can also be added to increase the efficiency of different wavelength. For example, the DPNH can be made to fluoresce by the addition of suitable fluorescing agents and the fluorescence determined using an appropriate filter, e.g. one which transmits the 313 and 366 mμ lines. These equivalent wavelengths will hereafter be referred to as "about 340 mμ."

This invention relates to an improvement in the latter kinetic approach involving a measure of the rate of change of absorbance at about 340 mμ. Previously this kinetic approach has not been considered suitable for batch analysis as it involves possible error due to instrument instability, and requires control of the temperature of the cuvette well of the photometer. The paper appearing in Scand. J. Clin. Lab. Invest. *17* 265 (1965) proposed to overcome these problems by stopping the reaction of pyruvate to lactate, after a fixed incubation period, by the addition of the enzyme inhibitor p-chloromecuribenzoate in highly alkaline solution. However, the stopping of the reaction with an enzyme inhibitor such as p-chloromecuribenzoate is limited by the toxicity of the compound to humans, the poor stability of its solutions, the danger of residues being left on glassware which inhibit future enzyme assays, and the poor stability of the absorbance of the stopped enzyme action.

In the procedures of this invention, both the forward and the reverse reactions of the enzymes can be stopped and the resulting absorbance stabilized by adjusting the pH of the reaction mixture after incubation to from about 10.0 to about 12.0, and preferably to about 10.5.

More particularly, this invention relates to the improvement in the spectrophotometric method for the determination of DPNH or TPNH in the presence of LDH or G6PDH respectively. Thus, after a suitable incubation period for reaction, the pH of the reaction mixture is adjusted to from about 10.0 to about 12.0, and preferably to about 10.5, to stabilize the resulting absorbance of the solution, without using effective amounts of an enzyme poison.

The term "photometric" refers to the use of an instrument measuring relative radiant power as a function of wavelength, using either a filter, prism or grating. Photometers which disperse light by prism or grating into a spectrum from which the desired band is isolated by mechanical slits are termed spectrophotometers. Spectrophotometers are usually more sensitive than filter photometers. The terms LDH, pyruvate, lactate, DPN, DPNH, G6PDH, G6P, 6-PGA, TPN, and TPNH are defined as before. The term "buffered solution" refers to an aqueous solution containing the appropriate buffers which are used or known to be suitable for use in the enzyme reaction and subsequent spectrophotometric reading at 340 mμ. The most common buffered solutions for use in the enzyme reaction in question are phosphate and pyrophosphate, although other buffers have been used in the reaction. The buffer of choice for the enzyme reaction is one for which the negative log of the apparent dissociation constant (abbreviated $pK_{a'}$) is at or near the optimum pH of the enzyme in question.

The pH of the reaction mixture can be adjusted to the range of from about 10.0 to 12.0 to stop the enzyme reaction and to stabilize absorbance at about 340 mμ by the addition of a suitable hydroxyl ion (OH−) containing base. To minimize problems of the formation of spectrally interfering substances, it is preferred to use an inorganic hydroxide base, preferably an alkali metal hydroxide such as sodium or potassium hydroxide. The volume of base added to the reaction mixture is not critical so long as the desired pH is reached. However reading errors on the spectrophotometer are minimized when the percent transmittance is between 20 and 70 percent. Thus it is desirable to use a base of an appropriate hydroxide concentration in an appropriate amount to afford the designated percent transmittance when used with the range of DPNH to be detected.

Because the enzyme reaction mixture is incubated in a buffered solution with a buffer that has a $pK_{a'}$ lower than 10.0 to 12.0, the pH of the solution after the addition of base is often lower than the pH of the added base. To avoid the problem of having to determine the pH of both the base added and the pH of the final solution, it is desirable to add the base in the form of a buffered solution.

The buffered bases desirable for use in altering the pH of the reaction mixture are those having a $pK_{a'}$ of 9 or greater. Thus examples of the preferred buffered bases for use in adjusting the pH are borate and carbonate buffers which in a 0.1 M concentration have $pK_{a'}$'s of, respectively, about 9.2 and 9.9. Thus, the addition of ten volumes of 0.1 M borate and carbonate buffers, pH 10.5 to one volume of 0.1 M phosphate buffer containing the enzyme reaction mixture and having a pH of about 7 can result in a stopped enzyme reaction and stabilized mixture with a pH above about 10.0. On the other hand the use of buffers with low $pK_{a'}$'s, e.g. use of 0.1 ,M pH 10.5 Tris, pyrophosphate, sodium barbital, glycylglycine or triethanolamine buffer in the same proportion to the orthophosphate buffered solution can result in pH's substantially lower than about 10.0 and a failure to stabilize the absorbance of the mixture at about 340 mμ.

The pH to which the enzyme mixture is adjusted to stabilize the absorbance at 340 mμ is critical. The critical range for pH adjustment is about 10.0 to about 12.0. The term "about" is used to indicate that the pH adjustment can be made to a point a few tenths of a pH point below 10.0 or above 12.0 without unacceptably altering the stability of the system. However acceptable stability is not achieved if the pH is adjusted to a point lower than 9.7 or higher than 12.3. Moreover, when using buffered base, the preferred range for stability is about 10.0 to about 11.0. The preferred pH range for adjustment is that which gives no observable absorbance change over a three hour period at temperatures up to the denaturation point of the enzyme involved. Nevertheless, an absorbance change over the three hour period of up to 7% with certain spectrophotometers may be considered acceptable for certain work.

The improvement for the determination of DPNH of this invention can be used in assays where lactic acid dehydrogenase is the unknown, in which case the sample thought to contain LDH is incubated with a buffered solution containing either pyruvate and DPNH (in which case the determination is made using the "forward" reaction) or containing lactate and DPN (in which case the "reverse" reaction is used). Likewise, the improvement of this invention can be used in assays for lactate or pyruvate, in which case known amounts of LDH and either DPNH or DPN are added to the reaction mixture. Similarly, the improvement of this invention can be used in an assay for DPNH or DPN, in which case known amounts of LDH and pyruvate or lactate are added to the reaction mixture. In all these cases, however, it is the DPNH or change in concentration thereof, that is the basis for the determination.

In a similar manner the improvement in the determination of the TPNH can be used in assays where any one of glucose-6-phosphate dehydrogenase, G6P, TPN, 6-PGA, or TPNH is the unknown. In all these cases, however, it is the TPNH or change in the concentration thereof, that is the basis for the determination.

In determining unkown lactate or pyruvate, the LDH enzyme system can be used as an indicator. For example it can be used in determining the activity of glutamic-pyruvic acid transaminase (GPT). The latter enzyme catalyzes the following reaction:

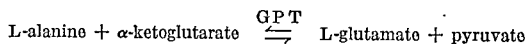

The activity of an unkown amount of GPT can thus be determined by adding to the above reaction mixture appropriate amounts of DPNH and LDH, then determining the rate of change of absorbance of the DPNH at about 340 mμ. and using the improvement of this invention to stop the LDH enzyme reaction and stabilize the absorption at the wavelength. Likewise, in the determination of creatine phosphokinase (CPK) which catalyzes the following reaction:

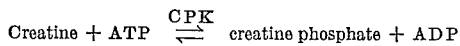
Creatine + ATP $\overset{CPK}{\rightleftharpoons}$ creatine phosphate + ADP There can be added to the system phosphoenolpyruvate and (PK) to result in the reaction:

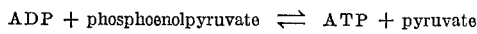
ADP + phosphoenolpyruvate $\rightleftharpoons$ ATP + pyruvate

Thus the rate of change in absorbance at 340 m$\mu$ upon the addition of appropriate amounts of DPNH and LDH to this system serves as an indicator of the CPK activity; and the improvement of this invention can be used to stop the LDH reaction and to stabilize the resulting absorbance.

The G6PDH enzyme system can also be used as an indicator when coupled to other enzyme systems. Following the reaction of these complex systems, the improvement of the present invention can be used to stabilize the absorbance of the TPNH when measured at about 340 m$\mu$. For example, the G6PDH enzyme system can be used in the determination of CPK activity. In this case the reverse reaction of CPK to that shown above, is utilized, in which creatine phosphate and ADP react with the formation of creatine and ATP. There can then be added to the system, glucose and hexokinase which results in the reaction below:

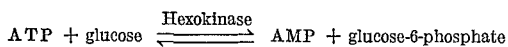
ATP + glucose $\overset{Hexokinase}{\rightleftharpoons}$ AMP + glucose-6-phosphate The G6P thus formed can then be utilized in the G6PDH reaction system and the improvement of the present invention can be used to stabilize the absorbance of TPNH when measured at about 340 m$\mu$.

The methods for all these determinations, with the exception of the final pH adjustment of this invention, are described and known in the prior art and can be used in the procedure of this invention.

The following examples are given to further illustrate the invention. Further modifications will also occur to those skilled in the art and thus the examples should not be considered limiting in spirit or in scope. In these examples temperatures are given in degrees centigrade (° C.), amounts of materials in grams (gms.), milligrams (mgs.), moles (M) or millimoles (mM.), liters (l.) and milliliters (ml.), concentrations of solutions as, molar (Molar) and millimolar (mMolar), wavelengths in millimicrons (m$\mu$), and lengths in millimeters (mm.).

EXAMPLE 1

Preparation of Reagents

Pyruvate Substrate.—A 0.1 M orthophosphate buffer, pH 6.75 at 37° is prepared by mixing appropriate amounts of disodium hydrogen orthophosphate and sodium dihydrogen phosphate in distilled water to afford a 0.1 Molar solution of pH 6.75 at 37°. The 1.59 mM. pyruvate substrate is prepared by adding sufficient sodium pyruvate to that 0.1 M orthophosphate buffer to afford a solution containing 1.59 millimoles of sodium pyruvate per liter of orthophosphate buffer. This solution can be preserved by adding a small amount of chloroform as a preservative. The chloroform-stabilized solution is stable for over a year if refrigerated at 2 to 10°.

$\beta$-DPNH-Pyruvate Working Solution.—Ten mg. of reduced $\beta$-diphosphopyridine nucleotide ($\beta$-DPNH) is mixed with 10 ml. of the pyruvate substrate prepared as above. The solution is stable for at least 2 hours at room temperature and at least 6 hours if refrigerated.

Lactic Acid Dehydrogenase (LDH).—The preparation used is a control serum which contains lactic acid dehydrogenase (LDH) obtained from beef heart (sold by General Diagnostics, a Versatol-E or Versatol-EN) having a designated activity in either International Units per ml. or in Wroblewski-La Due units per ml. One International Unit of Activity is defined as that amount of enzyme which causes an initial rate of oxidation of 1 micromole ($\mu$mole) of DPNH per minute per liter at 25° under the conditions specified by the International Union of Biochemistry.

One Wroblewski-La Due unit is defined as that amount of enzyme which causes a decrease in the absorbance of DPNH at 340 m$\mu$ of 0.001/min./ml. of samples at 32° under the conditions specified in Proc. Soc. Exp. Biol. Med. 90 210 (1955).

Procedure: The procedure used indicates the ability of the various test solutions used to stop the enzyme reaction. For each test solution used, 0.5 ml. of the $\beta$-DPNH-pyruvate working solution is placed into each of two, 16.8 mm. internal diameter, 19 mm. external diameter round cuvettes which have been matched at 340 m$\mu$ for this assay. The cuvettes are then placed in a water bath held at 37° and allowed to stand there for about 2 to 3 minutes. Then 0.05 ml. of LDH serum is added to one of the cuvettes with mixing. The LDH serum used here (Versatol-E Lot 0118038) contains 370 International Units per liter, which is equivalent to 768 Wroblewski-La Due per ml. Incubation of both cuvettes is continued at 37° for exactly 5 minutes. At the end of that five minute period 5.0 ml. of the test solution is added to each of the two cuvettes with mixing. Then 0.05 ml. of the LDH serum is added with mixing to the cuvettes in which no serum had been placed during incubation; this cuvette serves as the control sample. The cuvette which has been incubated for 5 minutes with the enzyme serves as the test sample. The percent transmission for both the cuvettes is read on a Coleman Junior II 6/20 spectrophotometer at 340 m$\mu$ which has been previously calibrated for accuracy at that wavelength. The first reading, i.e. 0 time, is taken immediately after the buffer addition in the case of the test sample and the buffer addition followed by the serum addition in the case of the control sample. Subsequent readings are taken 10, 20, 30, 40, 45, 60, 120 and 180 minutes after 0 time. Between readings the samples stand at room temperature of about 27°. For a given reading time the difference in absorbance of the control sample versus the test sample ($\Delta A/5$ min.) is observed from the instrument or can be calculated from the formula:

Absorbance = 2 − $\log_{10}$ percent transmission
= $\log_{10}$ (100/percent transmission Likewise the percent change in $\Delta A/5$ min. of the subsequent time readings ($\Delta A/5$ min. at T) from the 0 time reading ($\Delta A/5$ min. at 0) can be calculated by the formula:

$$\left(\frac{\Delta A/5 \text{ min. at } T - \Delta A/5 \text{ min. at } 0}{\Delta A/5 \text{ min. at } 0}\right) 100 = \text{percent change}$$

Various concentrations of sodium hydroxide in distilled water were used as test samples. The normality of representative test solutions used are given in the first column of Table 1 below. The pH of the test and control samples atfer the particular NaOH addition is given in the second column. The third column gives the $\Delta A/5$ min. for each of the timed readings and the percent change of this $\Delta A/5$ min. from the 0 time reading.

In the samples having a final pH of 7.9, the absorbance of both the control and test samples and the individual values for absorbance (A) decreased over the time interval studied. The percent change in the samples having a pH of 9.46 and 9.84 represent decreases in absorbance for both the control and test samples over the period studied. In the samples of pH 12.10, the absorbancy of the control sample remains substantially constant throughout the time interval, while the absorbancy of the test sample increased. The percent change for the samples of pH 12.34 and 13.2 represent ultimate decreases in the absorbancy for both the test and control samples. The negative difference in absorbancy for the samples of pH 13.8 show that the high concentration of base has completely altered the system.

of Versatol-E, Lot 0087027, which contains 461 International Units per liter, which is equivalent to 955 Wroblewski-La Due units per ml., rather than the lot used in Example 1.

TABLE 1

| Normality NaOH solution added | pH of sample after NaOH addition | | Time at— | | | | | | | |
|---|---|---|---|---|---|---|---|---|---|---|
| | | | 0 | 10 | 20 | 30 | 45 | 60 | 120 | 180 |
| (a) 0.00417 | 7.90 | ΔA/5 minutes | .112 | .097 | .089 | .072 | .056 | .048 | .017 | 0.12 |
| | | Percent change | | −13 | −20 | −36 | −50 | −57 | −85 | −89 |
| (b) 0.00625 | 9.46 | ΔA/5 minutes | .136 | .136 | .136 | .136 | 1.36 | .140 | .137 | .127 |
| | | Percent change | | 0 | 0 | 0 | 0 | 0 | +3 | +1 | −7 |
| (c) 0.00714 | 9.84 | ΔA/5 minutes | .114 | .114 | .114 | .114 | .114 | .114 | .113 | .113 |
| | | Percent change | | 0 | 0 | 0 | 0 | 0 | 0 | +1 | −1 |
| (d) 0.00833 | 10.26 | ΔA/5 minutes | .120 | .120 | .120 | .120 | .120 | .120 | .120 | .120 |
| | | Percent change | | 0 | 0 | 0 | 0 | 0 | 0 | 0 | 0 |
| (e) 0.0100 | 10.78 | ΔA/5 minutes | .113 | .113 | .113 | .113 | .113 | .113 | .113 | .113 |
| | | Percent change | | 0 | 0 | 0 | 0 | 0 | 0 | 0 | 0 |
| (f) 0.025 (pH 11.8) | 12.0 | ΔA/5 minutes | .143 | .143 | .143 | .143 | .143 | .143 | .143 | .143 |
| | | Percent change | | 0 | 0 | 0 | 0 | 0 | 0 | 0 | 0 |
| (g) 0.0312 | 12.10 | ΔA/5 minutes | .008 | .096 | 0.94 | .089 | .086 | .086 | .086 | .086 |
| | | Percent change | | −2 | −4 | −9 | −12 | −12 | −12 | −12 |
| (h) 0.0417 | 12.20 | ΔA/5 minutes | .090 | .090 | .090 | .090 | .090 | .090 | .090 | .090 |
| | | Percent change | | 0 | 0 | 0 | 0 | 0 | 0 | 0 | 0 |
| (i) 0.125 | 12.34 | ΔA/5 minutes | .104 | .104 | .104 | .102 | .106 | .108 | .107 | .110 |
| | | Percent change | | 0 | 0 | −2 | +2 | +4 | +3 | +6 |
| (j) 0.25 (pH 12.9) | 13.2 | ΔA/5 minutes | .125 | .105 | .118 | .132 | .134 | 1140 | .143 | .139 |
| | | Percent change | | −16 | −6 | +6 | +7 | +12 | +16 | +11 |
| (k) 2.5 N (pH 13.4) | 13.8 | ΔA/5 minutes | −.079 | −.054 | 0 | .024 | .010 | .040 | .040 | .040 |

EXAMPLE 2

0.1 M borate buffers of varying pH are prepared by dissolving 6.184 grams of boric acid in sufficient carbonate-free, aqueous sodium hydroxide to afford a solution of the desired pH upon adding sufficient distilled water to make a final volume of one liter. The final pH is checked and adjusted with 0.1 N sodium hydroxide if necessary. For example to prepare a 0.1 M borate buffer, pH 10.0, 6.184 grams of boric acid are dissolved in 439 ml. of 0.1 N aqueous sodium hydroxide; the pH is checked and adjusted as necessary with 0.1 N sodium hydroxide.

Substitution of 5 ml. of 0.1 M borate buffer, pH 10.5 for the sodium hydroxide in the procedure of Example 1, results in a mixture having a final pH of about 10.1. The absorbance of both the control sample and the test sample was unchanged throughout the 180 minute reading period, thus resulting in no change in the ΔA/5 min. readings for the individual samples. Identical stability is observed when the samples are held at 37° throughout the 180 minute reading period.

The substitution of 5 ml. of 0.1 M borate buffers, having pHs of, respectively, 9.0, 9.2, 9.4, 9.6 and 9.8 for the 5 ml. of aqueous sodium hydroxide in the procedure of Example 1, all resulted in decreases in the ΔA/5 min. over the 180 minute reading period. These decreases were due to decreases in absorbancy for both the control and test samples. Thus using 0.1 M borate buffer, pH 9.0 the ΔA/5 min. at 0 time was 0.304, but by the time of the 180 minute reading was 0.213, a percent decrease in ΔA/5 min. of 29%. For the 0.1 M borate buffer, pH 9.8 the ΔA/5 min. at 0 time was .271, while the figure at the 180 minute reading was .264, a percent decrease of 4%.

The substitution of 5 ml. of 0.1 M borate buffers, having pH's of, respectively, 10.0, 10.2, 10.4, 10.6, 10.8 and 11.0 resulted in samples with no significant change in absorbance over the 180 minute reading period. 0.1 M borate buffers with higher pH's, up to 11.8 can be used, but result in percent changes in absorbancy over the 180 minute reading period varying from 0% to 4%.

The LDH serum used in this example was 0.05 ml.

EXAMPLE 3

0.1 M carbonate buffers are prepared by mixing appropriate amounts of disodium carbonate and sodium hydrogen carbonate with distilled water to give the desired pH. For example 0.1 M carbonate buffer, pH 10.0 at 25° is prepared by mixing 58 ml. of 0.1 M aqueous disodium carbonate solution with 42 ml. of 0.1 M aqueous sodium hydrogen carbonate solution.

Substitution of 5 ml. of 0.1 M carbonate buffer, pH 10.0 in the procedure of Example 1 for the 5 ml. of aqueous sodium hydroxide, results in stabilization of the absorbance of the test and control samples over the 180 minute reading period. Use of 0.1 M carbonate buffer pH 9.0 fails to stabilize the absorbance, resulting in a percent decrease in ΔA/5 min. at the 180 minute reading of roughly 20%. Use of 0.1 M carbonate buffer, pH 11.9 resulted in a percent in ΔA/5 min. at the 180 minute reading of 0%, but with an increase in the ΔA/5 min. at the 10, 20, 30 and 40 minute readings.

EXAMPLE 4

0.1 M 2-amino-2-methyl-1-propanol buffer, pH 10.5 is prepared by adding appropriate amounts of 2-amino-2-methyl-1-propanol to distilled water then adjusting the pH to 10.5 with hydrochloric acid. Substitution of 5 ml. of 0.1 M 2-amino-2-methyl-1-propanol buffer, pH 10.5 for the 5 ml. of aqueous sodium hydroxide in the procedure of Example 1, results in a final pH for the mixture of 10.32. The absorbance of the control and test samples are stabilized over the 180 minute reading period, the percent change in ΔA/5 min. over that period being equal or less than 2%.

The use of equivalent amounts of 0.1 M, pH 10.5; tris, pyrophosphate, sodium barbital, glycylglycine and triethanolamine buffers, respectively, in the procedure of Example 1 results in final pH's of 9.4 or less and decreases in absorbance for both the test and control samples over the 180 minute reading. The percent decrease in ΔA/5 min. at the 180 minute reading ranges from 14% in the case of the glycylglycine buffer having a final pH of 9.38 to 19% in the case of the sodium barbital buffer, where the pH of the resulting samples is 9.22.

EXAMPLE 5

A buffered aqueous substrate is prepared consisting of distilled water containing sodium pyrophosphate, L(+)-lactic acid and diphosphopyridine nucleotide (DPN) in a concentration per liter of, respectively, 0.05 M, 77.5 mM. and 5.25 mM., respectively, and having a pH of 8.80. 0.5 ml. of this buffered substrate is placed into each of four round cuvettes, which have an external diameter of 19 mm. and an internal diameter of 16.8 mm. and which have been previously matched at 340 m$\mu$ wavelength. The cuvettes are placed in a water bath held at 37° for about 2 minutes to bring the contents up to this temperature. Into each of three of the four cuvettes there is added with mixing 0.05 ml. of control serum (Versatol-E, Lot 0087027, which contains 185 International Units of lactic acid dehydrogenase per liter, which is equivalent to 382 Wacker Units per ml. Incubation is continued at 37° in the first tube to which enzyme has been added for 2 minutes, in the second tube for 5 minutes and in the third tube for 10 minutes. At the end of these time intervals 5.0 ml. of 0.1 M borate buffer, pH 10.0 prepared as in Example 2 is added to the tubes with mixing. To the tube that originally received no enzyme, there is added 5.0 ml. of the 0.1 M borate buffer and 0.05 ml. of the control serum; this cuvette serves as the control sample. The 2, 5 and 10 minute incubation mixtures serve as the test samples. As in Example 1, readings of percent transmission are made on a Coleman Junior II 6/20 spectrophotometer at 340 m$\mu$, which has been previously calculated for accuracy at that wavelength. The first reading, i.e. 0 time is taken immediately after the buffer addition in the case of test samples and the buffer addition followed by the serum addition in the case of the control sample. Subsequent readings are taken at 10, 20, 30, 40, 45, 60, 120 and 180 minutes after the 0 time.

The use of 0.1 M borate buffer, pH 10.0 in the above procedure results in absorbance uniformity for each of the control and test samples throughout the 180 minute reading period.

EXAMPLE 6

The procedure of Example 1 is repeated except that in the first series of cuvettes 5 ml. of 0.0555 N sodium hydroxide containing 0.555% by weight p-chloromecuribenzoate is used in place of the 5 ml. of sodium hydroxide used in that Example 1 and in the second series of tubes 5 ml. of 0.0555 N sodium hydroxide is used in place of the 5 ml. of sodium hydroxide in the concentrations used in Example 1.

In the cuvettes containing the p-chloromecuribenzoate in sodium hydroxide, the final pH was 12.02, the absorbance for both the control and the test sample increased during the 180 minute reading period, the $\Delta$A/5 min. at 0 time being .075 and at the 180 minute reading being .089, a percent increase of $\Delta$A/5 min. of 18.7 percent. On the other hand using that concentration and amount of sodium hydroxide without the p-chloromecuribenzoate afforded a final pH of 12.02, the $\Delta$A/5 min. at 0 time being .092 and at the 180 minute reading being .091, a change of only 1%. Thus it appears that better absorbance stability at the indicated pH is achieved without the use of the enzyme poison p-chloromercuribenzoate.

EXAMPLE 7

The procedure of Example 1 is carried out except that 5.0 ml. of 0.1 M borate buffer, pH 10.5 (prepared as in Example 2) is substituted for the 5.0 ml. of the sodium hydroxide solution used in that Example 1, and 0.05 ml. of human serum obtained from, respectively, apparently healthy humans, autopsy-proven cases of myocardial infraction and autopsy-proven cases of infectious hepatitis, is substituted for the 0.05 ml. of LDH control serum used in Example 1. The absorbance of the resulting solution was unchanged throughout the 180 minute reading period.

Although the pH of the incubation mixture used in Example 1 and in the preceding paragraph is 6.75, lower and higher pH's of the incubation mixture can be used depending on the pH optimum of the LDH enzymes under consideration. Thus, although the pH optimum for the LDH enzymes found in apparently-healthy humans is about 6.5±0.2, the isoenzymes present in certain disease states may have higher or broader, or both, optimum pH. Although pH of 6.75 used in the described procedure minimized variations due to the different pH optimum of the isoenzymes present, satisfactory results can be obtained by carrying out the incubation at a pH as high as 7.0 or in some cases as high as 7.5 and 8.0.

EXAMPLE 8

The G6PHD enzyme system can be used as an indicator in the measurement of CPK activity and following the reaction catalyzed by CPK the improvement of the present invention can be used to stabilize the absorbance of the TPNH so formed.

Preparation of Reagents

The following substrates, enzymes and cofactors were dissolved in distilled water to give the final concentrations indicated: creatine phosphate 1.7 mM.; TPN, 4 mM., ADP, 2 mM.; hexokinase, 1 Unit/3 mls.; G6PDH, 1 Unit/ 3 mls.; glucose 10 mM.; MgSO$_4$, 5 mM.; cysteine, 4 mM.; tris buffer, 0.07 M, pH 7.0; AMP 20 mM. The reagent prepared in this form was stable for at least 6 hours at room temperature or 2 days when refrigerated.

The stabilizing solution was prepared by dissolving 30.6 grams potassium tetraborate tetrahydrate in distilled water, bringing this solution to pH 10.5 with sodium hydroxide and diluting the whole solution to 1 liter.

Procedure: The G6PDH enzyme system in conjunction with the Hexokinase system and substrates for the CPK reaction can be used to measure the CPK activity of serum. Thus, tubes containing 1.0 mls. of the complex substrate enzyme cofactor solution, as described above, are warmed at 37° centigrade in a water bath for several minutes. Then, 50 $\mu$l. of serum is added to the relevant tubes and after 30 minutes incubation, 5.0 mls. of stabilizer solution is pipetted into each tube. The absorbance of the solution is then measured at 340 m$\mu$. The CPK activity is then obtained from the equation below:

International Units (IU)

$$= \frac{A_{340} \cdot D \cdot V \cdot S \cdot F}{t \cdot e \cdot d} \text{ [Calibration Factor]}$$

where:

$A_{340} = A_{sample} - A_{blank}$
$D = 20{,}000$ [converts 50 $\mu$l. of serum to 1 liter]
$V = 1.05$ ml. [volume of reactants]
$S = 5.76$ [compensates for dilution by stabilizer]
$F = 0.58$ [converts CPK activity to IU at 30° C.]
$t = 30$ min. [duration of incubation]
$e = 6.22$ cm.$^2$ $\mu$mole [extinction coefficient of NADPH]
$d = 1$ cm. [length of light path]

Results: The CPK activity of 2 sera were assayed by the procedure above. After the addition of the stabilizing solution, the absorbance was measured every 60 minutes for 5 hours. In both cases the increase in absorbance was slight during this time, amounting to less than a 2% rise at the end of 5 hours. This example demonstrates the ability of the stabilizing reagent to prevent further generation of TPNH in the above enzyme system.

EXAMPLE 9

The improvements of the present invention can be used in the determination of the pH optimum of the coupled CPK and G6PDH enzyme reactions.

The complex enzyme/substrate/cofactor reagent was prepared in an essentially similar manner to that described above. However, prior to the addition of the serum sample the pH of the substrate/enzyme solution was adjusted to one of four values between 6.6 and 7.2. The CPK activity of the serum samples was then determined at the four different pH values and the activity was calculated as described before.

The CPK activity of the serum was similar at each of the four pH values tested, although optimum pH was approximately 6.8.

What is claimed is:

1. In the method for determination of lactic acid dehydrogenase or glucose-6-phosphate dehydrogenase activity wherein the enzymatic reduction or oxidation of di-or triphosphopyridine nucleotide coenzymes in the presence of lactic acid dehydrogenase or glucose-6-phosphate dehydrogenase and its substrate is measured by the rate of change in the spectrophotometric absorbance of said coenzymes, the improvement comprising terminating the enzymatic reaction by adjusting the pH of the reaction to 10–12 by means of the addition of approximately 10 volumes of a buffer solution selected from the group consisting of aqueous alkali metal hydroxide, aqueous borate and aqueous carbonate.

2. The process of Claim 1 in which the substrate-coenzyme combination for lactic acid dehydrogenase is either pyruvate and reduced di-phosphopyridine nucleotide or lactate and di-phosphopyridine nucleotide.

3. The process of Claim 1 in which a substrate-coenzyme combination for glucose-6-phosphate dehydrogenase is either glucose-6-phosphate and tri-phosphopyridine nucleotide or 6-phosphogluconic acid and reduced tri-phosphopyridine nucleotide.

4. The process of Claim 2 in which the pyruvate is generated as a result of the reaction of creatine and adenosine triphosphate, in the presence of creatine phosphokinase followed by the reaction of the adenosine diphosphate so formed with phosphenol pyruvate in the presence of pyruvatekinase.

5. The process of Claim 3 in which the glucose-6-phosphate is generated as a result of the reaction of creatine phosphate and adenosine diphosphate in the presence of creatine phosphokinase followed by the reaction of the adenosine triphosphate with glucose in the presence of hexokinase.

6. The process of Claim 1 in which the pH is adjusted to about 10.5.

7. The process of Claim 6 in which the buffer solution is an aqueous alkali metal hydroxide.

8. The process of Claim 6 in which the buffer solution is aqueous sodium hydroxide.

9. The process of Claim 1 in which the pH of the reaction mixture is adjusted to a pH in the range of from about 10.0 to about 11.0.

References Cited
UNITED STATES PATENTS
3,331,752   7/1967   Struck et al. _____ 195—103.5 R

OTHER REFERENCES

Raabo, "Scandinav. J. Clin. & Lab. Investigation" *17*:265–270 (1965).

Lowry et al., "J. Biol. Chem." *236*(10):2756–2759 (1967).

Colowick et al., "Methods in Enzymology" Vol. X:680–681 (1967).

Levy, "J. Biol. Chem." *238*(2):775–784 (1963).

Winer et al., *225*:1065–1083 (1957).

ALVIN E. TANENHOLTZ, Primary Examiner